United States Patent [19]

Lambot et al.

[11] Patent Number: 4,569,710

[45] Date of Patent: Feb. 11, 1986

[54] PROCESS FOR MANUFACTURING THE INNER TUBE ELEMENT FOR A DOUBLE TUBE CORING APPARATUS

[75] Inventors: Honoré J. Lambot, Wauthier-Braine, Belgium; Johannes H. M. Fliervoet, Zwolle; Pieter Kramer, Hardenberg, both of Netherlands

[73] Assignees: Societe Anonyme Diamant Boart, Brussels, Belgium; Wavin B.V., Zwolle, Netherlands

[21] Appl. No.: 560,001

[22] Filed: Dec. 9, 1983

Related U.S. Application Data

[62] Division of Ser. No. 335,031, Dec. 28, 1981, Pat. No. 4,428,602.

[30] Foreign Application Priority Data

Dec. 30, 1980 [BE] Belgium .................................. 203359

[51] Int. Cl.$^4$ ............................................. B65H 81/00
[52] U.S. Cl. ........................................ 156/172; 156/187
[58] Field of Search ......................... 156/172, 190–192, 156/171, 187–188; 175/245

[56] References Cited

U.S. PATENT DOCUMENTS

| | | | |
|---|---|---|---|
| 2,628,822 | 2/1953 | Herndon | 175/245 |
| 3,092,192 | 6/1963 | Deely | 175/253 |
| 3,661,670 | 5/1972 | Dierpont | 156/172 |
| 3,768,842 | 10/1973 | Ahlstone | 138/141 X |
| 3,874,465 | 4/1975 | Young et al. | 175/251 X |
| 4,238,539 | 12/1980 | Yates et al. | 156/172 X |
| 4,289,557 | 9/1981 | Stanwood et al. | 156/171 |
| 4,368,124 | 1/1983 | Brumfield | 156/172 X |

FOREIGN PATENT DOCUMENTS

1356353  4/1974  United Kingdom ................ 156/172

*Primary Examiner*—David Simmons
*Attorney, Agent, or Firm*—Sughrue, Mion, Zinn, Macpeak & Seas

[57] ABSTRACT

The invention relates to a process for manufacturing an inner tube element made of synthetic resin for a double tube coring apparatus provided for deep boring. The tube element is provided with coupling nipples for connecting it to other inner tube elements. Fibers coated with synthetic resin are wound helically onto a cylindrical mandrel so as to overlap each nipple. This process gives the tube element a higher strength than that of glued nipples.

1 Claim, 6 Drawing Figures

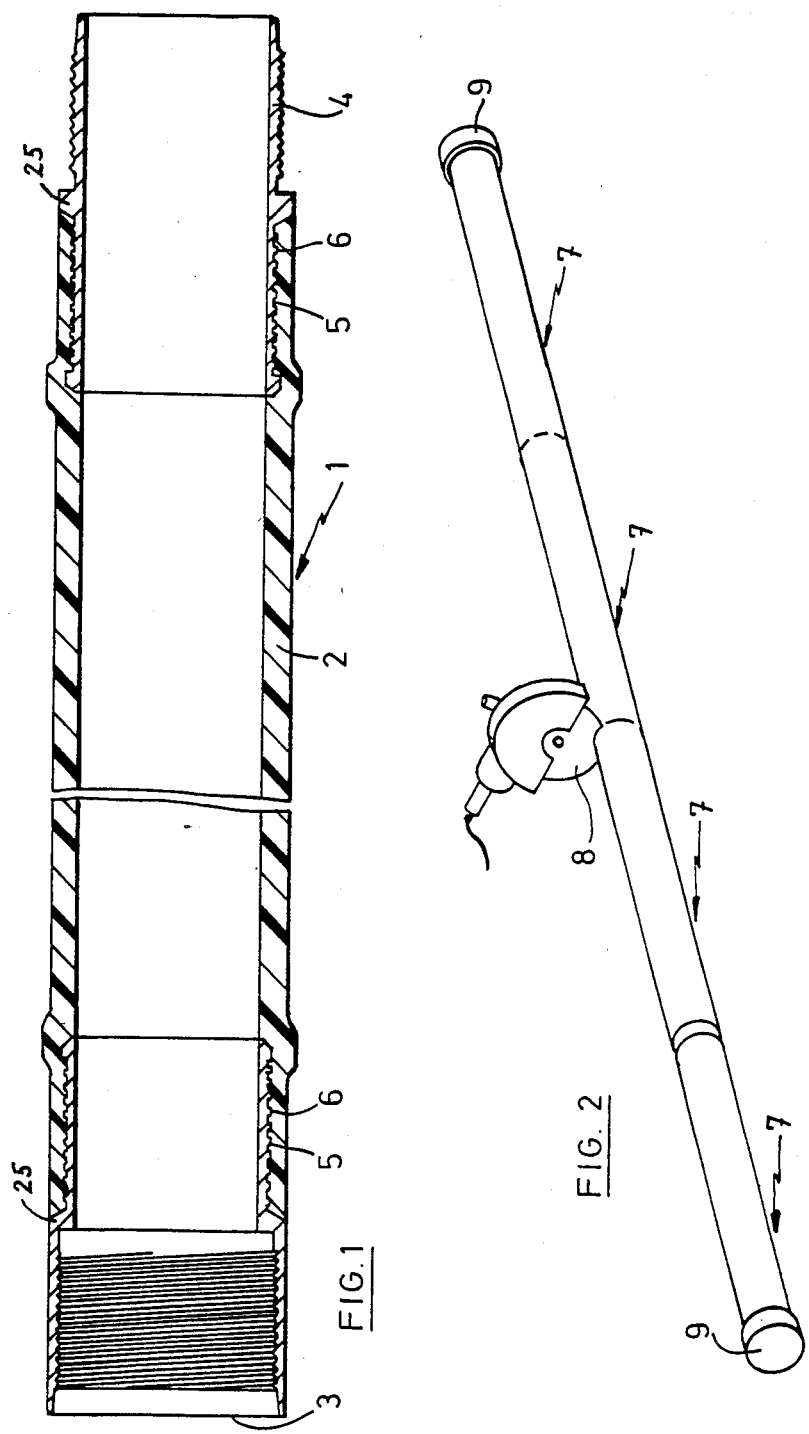

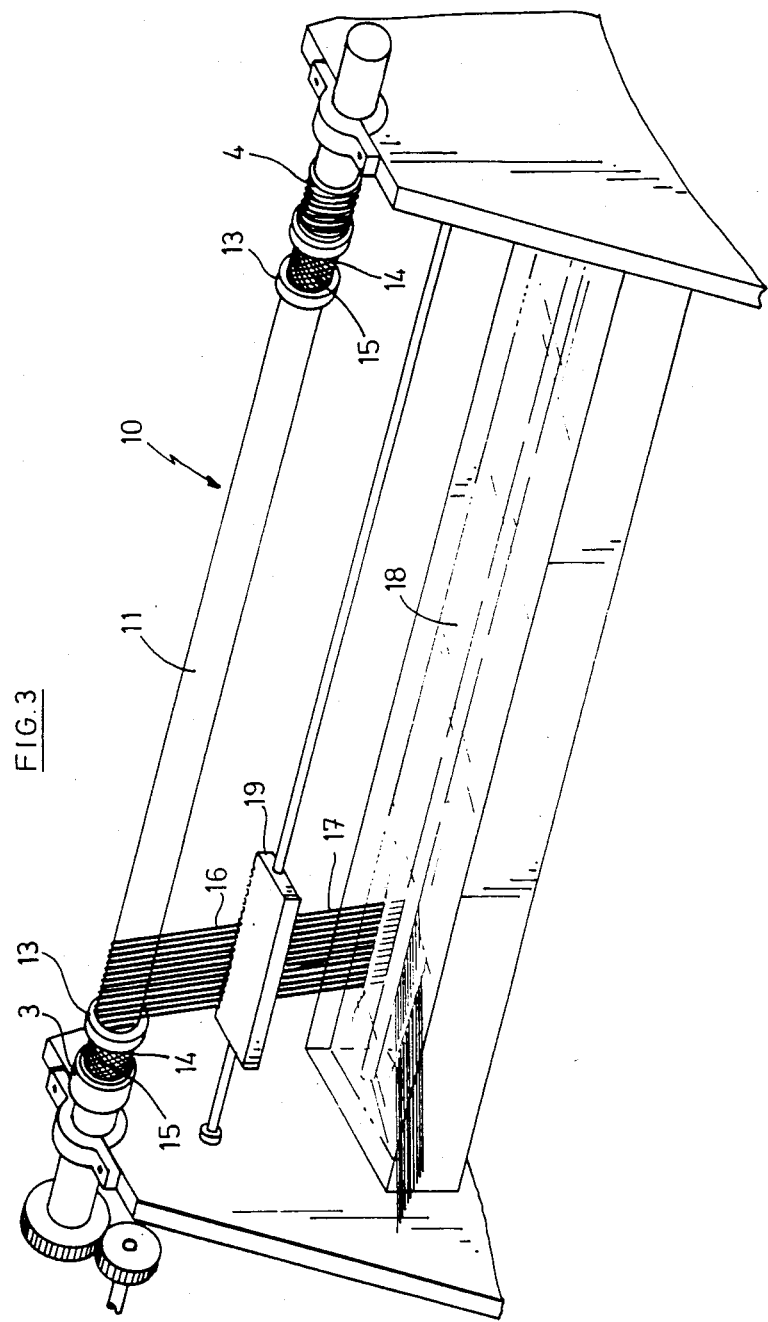

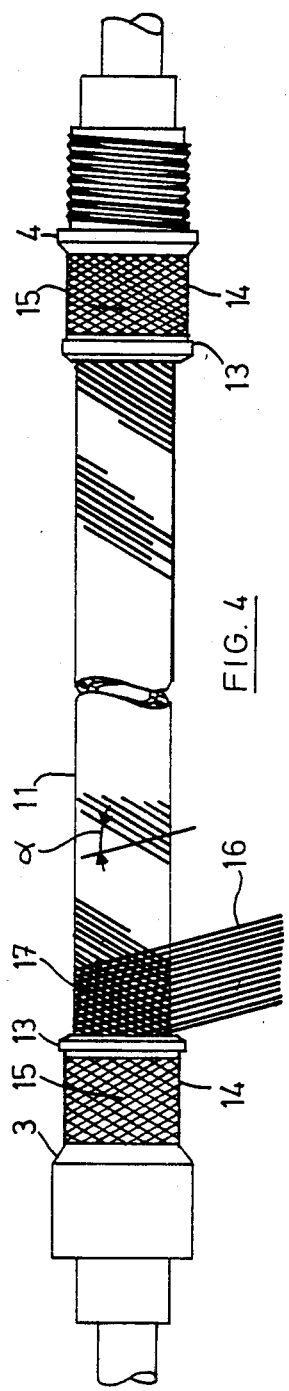
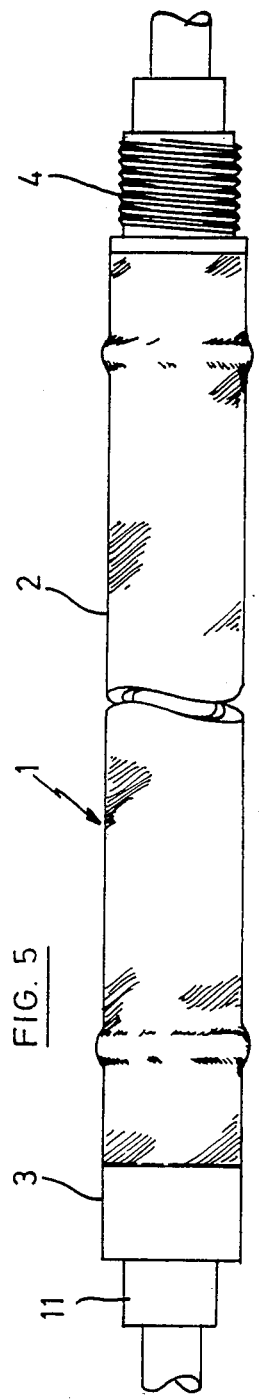
FIG. 4
FIG. 5

PROCESS FOR MANUFACTURING THE INNER TUBE ELEMENT FOR A DOUBLE TUBE CORING APPARATUS

This is a division of application Ser. No. 335,031, filed Dec. 28, 1981, now U.S. Pat. No. 4,428,602.

FIELD OF THE INVENTION

This invention relates to a process for manufacturing an inner tube element for a double tube coring apparatus, said element consisting of a rigid tube length having a substantially constant section, made of synthetic resin and provided at its ends with nipples or couplings for connecting it to other inner tube elements.

PRIOR ART

Coring apparatuses provided with two coaxial tubes are commonly used in mining or petroleum drilling for taking a sample of the geological layers crossed by the coring apparatus. These apparatuses comprise, on the one hand, an outer tube consisting of an outer set of hollow rods carrying a boring crown and, on the other hand, an inner tube consisting of an inner set of hollow rods for receiving a core, the inner tube being longitudinally locked by a swivel system at one of its ends to the outer tube which, thus, can rotate about this inner tube which is provided, at its other end, with a core extracting sleeve. The inner tube is generally made of steel.

The U.S. Pat. No. 3,092,192 discloses a coring apparatus comprising an outer tube made of steel, an inner tube also made of steel and possibly comprising two semitubular members, as well as a third coaxial tube entirely made of synthetic resin and used for enclosing and protecting a sampled core.

Said three-tube apparatuses commonly called "liners" are cumbersome. The presence of a third tube made of synthetic resin reduces the section of the coring apparatus which is available for collecting the core. The results of analysis made during a mining or petroleum drilling are all the more precise that the section of the core is larger. Moreover, the manufacture of triple tube coring apparatuses is difficult, since the dimensions of these apparatuses must be adapted to the dimensions of the tube made of synthetic resin and vice-versa. The manufacture tolerances are severe, since the tube made of synthetic resin must closely match the inner tube made of steel.

The U.S. Pat. No. 3,874,465 discloses a coring apparatus comprising three coaxial tubes, which is similar to the above described apparatus, except that the inner tube is made of two semitubular portions made of synthetic resin reinforced with glass fibers. The inner surface of the semitubular portions is coated with a further tube made of synthetic rubber.

The triple tube coring apparatus according to U.S. Pat. No. 3,874,465 comprising a tube made of synthetic resin are also cumbersome and allow the collection of a core having a smaller section than that of a core obtained by a double coring apparatus, when both apparatuses have the same outer diameter.

The manufacture of a coring apparatus according to U.S. Pat. No. 3,874,465 comprising a tube made of synthetic resin is also difficult. In a first step, a tube made of synthetic resin reinforced by means of glass fibers must be manufactured. The tube must then be longitudinally severed by means of a saw so as to form two semitubular portions. When the tube is sawn, a cloud of synthetic resin dust loaded with fine particles of glass fibers is unavoidably formed, said dust irritating the respiratory tract and causing itching on the body. Moreover, said glass fiber particles are considered as cancerigenic.

The above described known coring apparatus has also a weak resistance to bursting.

The cores collected in deep borings from geological layers having a substantial content of volatile elements contain occluded or adsorbed gases which are submitted to considerable pressures, to which the inner tube of the coring apparatus must resist, when said tube is retrieved. As soon as the coring apparatus is retrieved outside the well, the boring core is cleared by unfastening and removing the semitubular elements. The latter contain a rubber sleeve which becomes deformed and releases the gases. Said rubber sleeve protects the core against any deterioration, but does not allow to retain all the volatile materials in said core.

The geological sampling by means of such steel core barrels does not involve many difficulties in hard and compact formations; indeed the diamond cut core has a very smooth surface and is gradually introduced in the core barrel inner tube, as the cutting tool progressively penetrates the formations.

The traction force to be exerted on the core barrel for breaking out and cutting off the sample collected in a rock layer may be very important so that the inner tube is stretched sometimes with permanent deformation of the inner tube until the bottom part of the tube lean against a shoulder of the steel outer tube, which can transfer more important tensile force able to detach the core.

In soft or very soft non-consolidated formations, small pieces of rock can happen to jam in the inner tube, including an obstacle which prevent the core to be pushed forward in that inner tube. Pieces of core are then crushed by the core bit and are eliminated in the drilling fluid, so that the rate of sample recovery slows down.

Moreover, the extraction from an inner tube, of a core consisting of loose particles resulting from non-consolidated formations, after pull out of the core barrel occurs with difficulty, when the inner tube is realized in steel. Most problems result from broken non-consolidated rocks.

Threaded filament wound pipes are already known. U.S. Pat. No. 3,572,392 (McLarty) discloses an improved process of manufacture of threaded filament wound pipes comprising helically winding resin impregnated fiberglass filament upon a mandrel knurled at the ends in the form of helical threads.

The process comprises at least partially coating with a release agent, a mandrel having an unthreaded central portion and having two end knurled in the form of pipe threads, helically overwinding said mandrel with resin impregnated fiberglass filaments, thereby forming a filament wound pipe threaded internally and externally.

The male end portion of the filament wound pipe is formed by means of a detachable annular ring constructed of a thermoplastic or a plastic resin positioned by means of a mandrel assembly. The outer surface of this annular ring is then covered with helical knurls which are used to form the exterior threads of the male end of the pipe.

For preparing the female end of the pipe, a form provided with helical knurls is fitted on the central mandrel portion.

Fiberglass filaments are helically wound upon the knurls so that they form a thick with resin impregnated fiberglass layer, the inner surface of which is provided with interior threads at its ends.

When the resin is cured, the knurls are removed and a threaded filament wound pipe is obtained.

In this known process, the threads are not tapped in the wall of the pipe by cutting and removing matter, but they are formed upon the helical knurls by a particular method of filament winding under a combination of filament angles, wherein said filament alternately deviates in radial disposition. This method preserves the length of the fiberglass filaments reinforcing the pipe, so that the whole strength of the fiberglass can be utilized. For all that, the profile and the size of the threads obtained, which must be especially dimensioned in order to offer a sufficient tensile strength, are not adapted to be locked in the swivel of conventional double-tube coring apparatuses.

Moreover, the manufacture of the male end of the pipe is difficult since the tolerance of the threads and the dimension of the pitch must be small enough to warrant a strong coupling between engaged threads.

BRIEF DESCRIPTION OF THE INVENTION

An object of the invention is to provide a process for manufacturing a tube capable of accurately replacing the steel inner tube of a conventional coring apparatus by a fiberglass wound pipe of the same size.

Another object of the present invention is to provide a process for avoiding the above described drawbacks, while perfectly protecting and allowing an easy handling of the boring cores, and to produce a threaded filament, which presents a sufficient tensile strength, wound by means of an elementary winding machine without any need for reprogramming.

This invention relates to a process for the manufacture of an inner tube element for a double tube coring apparatus, said element consisting of a rigid tube length having a substantially constant section, made of synthetic resin, provided with couplings for connecting it to other inner tube elements, said process being essentially characterized by the fact that at least one nipple is placed onto a cylindrical mandrel having a constant section and rotating about its longitudinal axis, at a predetermined distance corresponding to the tube element to be manufactured, a part of said nipple having an inner diameter substantially identical to the diameter of the mandrel and having a rough surface, and fibers coated with a synthetic resin are wound helically onto said cylindrical mandrel, so as to overlap the rough part of said nipple.

According to a feature of the process, the fibers are wound in the form of twisted fiber webs crossing each other, so that the crossing angle is comprised between 40° and 60° in order to grip a multiplicity of ribs or corrugations of the nipple.

In a particular embodiment of the process according to this invention, each steel nipple or coupling provided with a gripping ring having an inner diameter which is substantially equal to the diameter of a mandrel and having an outer milled or knurled surface is placed onto said mandrel at a predetermined distance from the other end, and webs of fibers coated with a synthetic resin are wound helically onto the mandrel and onto each of said rings of the spaced nipples.

It has surprisingly been found that the inner tube elements according to this invention which are made of synthetic resin reinforced by means of fibers, preferably glass fibers, have a bursting, collapsing and tensile strength which is quite comparable to that of an inner tube made of steel, in spite of the high temperatures which prevail in the boring wells in which the coring apparatuses are used.

DETAILED DESCRIPTION OF THE INVENTION

Other details and features of the invention will appear in the following description of the attached drawings which show diagrammatically, as a non limiting example, an embodiment of an inner tube element according to this invention and which illustrate the process for the manufacture of said inner tube element.

In these drawing:

FIG. 1 is a longitudinal section of an inner tube element according to the invention, provided with tapped or threaded couplings or nipples;

FIG. 2 is a perspective view of a tube section containing a core portion;

FIG. 3 is a perspective view of a machine for the manufacture of an inner tube element according to the invention;

FIG. 4 is a longitudinal section of a tube element while being manufactured in the machine shown in FIG. 3;

FIG. 5 is a longitudinal section similar to that of FIG. 4, showing an entirely manufactured tube element.

In these figures, the same references designate the same or similar parts.

Figure 6:
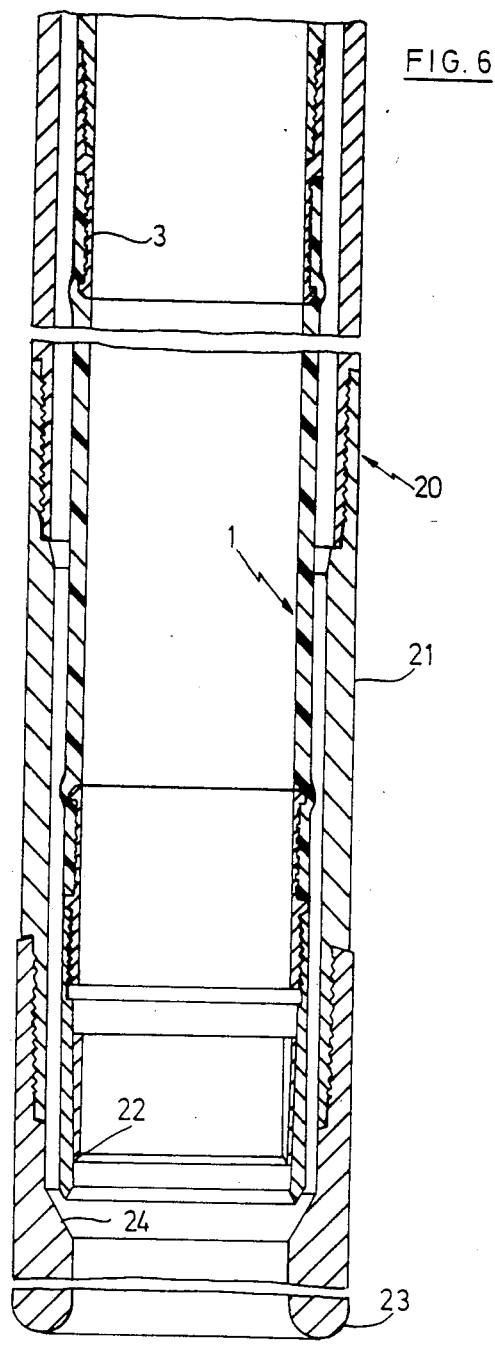
FIG. 6 is a longitudinal section of a double tube coring apparatus comprising an inner tube element according to the invention.

The inner tube element 1 for a double tube coring apparatus according to this invention, shown in FIG. 1, consists of a rigid tube length 2 made of epoxy resin, provided, at its ends, with a female threaded coupling nipple 3 and with a male threaded coupling nipple 4, both nipples being made of steel.

The section of the tube element is substantially constant. The epoxy resin is reinforced by means of twisted fibers, preferably glass fibers. The tube element 1 overlaps, at each of its ends, a part of a steel nipple 3, 4 having a rough surface 6 gripped by said twisted fibers. The twisted fibers 5 are preferably in the form of webs. The nipples 3,4 each comprise a knurled or milled ring 13 having a shoulder 25.

The steel nipples 3, 4 extend coaxially to the tube element 1 at each end of the latter. Said nipples 3, 4 are embedded in the tube element 1, so that the inner diameter of the nipple part overlapped by the tube element is equal to the inner diameter of this element.

As soon as the coring apparatus is retrieved, without the necessity of clearing the collected core from semitubular envelopes, the inner tube element 1 containing the collected core is cut into sections 7 of suitable length by means of a tool which is not cumbersome and may, for example, be a portable circular saw 8 (FIG. 2).

The sections 7 of inner tube 1 may be used as core boxes for the transport and the conservation of the cores, before and after the longitudinal severing of said sections 7.

For this purpose, the section 7 of inner tube 1 may be closed at their ends by means of caps 9.

The machine shown in FIG. 3, designated in general by reference 10, is used for the manufacture of an inner tube element according to this invention. Said machine comprises a mandrel 11 which may rotate about its longitudinal axis I—I'. This mandrel 11 is rotated by means of a pinion 12.

Onto the mandrel 11 are placed, at a predetermined distance corresponding to the desired length of the tube length or element, a male female coupling nipple 3 and a male coupling nipple 4 comprising each a gripping ring 13 having an inner diameter substantially equal to the diameter of the mandrel 11, as well as an outer surface 14 provided with corrugations 15 (knurled surface) and a shoulder 25. These rings 13 face each other on the mandrel 11, as shown in FIG. 3.

The grooves of the corrugations or knurlings 15 correspond to the diameter of the twisted fibers 16 which are helically wound onto the mandrel 11 for reinforcing the body of the inner tube element 1. The twisted fibers 16 are made of a multiplicity of strands of glass fibers. The fibers are used in the form of woven or non woven webs 17, which are impregnated with an epoxy resin in the resin bath 18. The fiber webs are then helically wound onto the mandrel 11 of the machine, so as to obtain superimposed homogeneous web layers crossing each other by an angle α comprised between about 40° and 60°. The fiber webs 17 are guided by means of a slide 19. An epoxy resin prepared from ethylene oxide or epichlorhydrine and bisphenol A is advantageously used.

The crossing angle is responsible for the tensile strength and for the bursting resistance of the tube element 1. The more the crossing angle is large, the more the tensile strength will be large, but the more the bursting angle will be small.

For an inner tube element having an average diameter of 12 centimeters, a crossing angle of about 55° is preferably selected. Such an angle gives a resistance to tensile forces of more than 3000 kilograms.

In order to expedite the hardening of said epoxy resin, a hardening agent, such as an aqueous solution of a peroxide, is regularly sprayed onto the surface of the tube element 1 during the manufacture thereof. The fiber webs 17 are wound onto the mandrel 11, so as to cover the knurled rings 13 up to the shoulders 25 of the coupling nipples 3, 4, so as to embed firmly said nipples into the body of the tube element 1, as shown in FIGS. 1, 4 and 5.

One function of the shoulders 25 is to define how far the fiber webs 17 should be wound onto the nipples 3, 4 and to provide a flange on which the resin tube 2 may rely in order to allow the tube element 1 to resist large axial compression forces. These shoulders also serve to provide a stop edge which comes in abutment with the lower end of the threaded portion of a connected tube element.

As the glass fiber webs 17 have a very high tensile strength, they confer to the tube elements 1 a resistance which is quite comparable to that of a steel tube, not only in respect of bursting and crushing or collapsing, but also in respect of traction.

During the retrieval of the coring apparatus, the inner tube thereof is sometimes submitted to very high pressures.

The traction force to be exerted by a coring apparatus 20, as shown in FIG. 6, for separating a core collected in a rock layer may be very important. For this purpose, the entire coring apparatus 20, including the inner tube 1 and the outer tube 21 is raised. Whereas the outer steel tube 21 is freely raised without being deformed, the inner tube 1 is locked at one end by the core extracting sleeve 22 at the lower end of the coring apparatus. Since the inner tube 1 is fixed to the outer tube 21, at its other end, by means of a latch (not shown), said inner tube 1 is submitted to an important traction and is unavoidably stretched on a length corresponding to the distance between the core extracting sleeve 22 and the boring crown 23, for enabling the flow of a boring fluid.

When it is stretched, the inner tube 1 causes the core extracting sleeve 22 to bear against a shoulder 24 of the boring crown 23. The outer tube 21 which is entirely made of steel can transfer much more important tensile forces to the boring crown than the inner tube 1.

The important tensile forces to be used for detaching the core from the core extracting sleeve 22 are applied to the core through said shoulder 24 rigidly maintained with respect to the outer tube 21.

The elongation or stretching of the inner tube corresponds normally to the distance between the core extracting sleeve 22 and the shoulder 24 of the boring crown 23, said distance being needed for enabling the boring fluid to flow toward the boring crown.

Due to the fact that they are anchored to the twisted glass fibers, the coupling nipples 3, 4 of usual size (4 inches) are capable of resisting enormous tractions of three to ten tons which may occur in deep borings, without danger of shearing or deformation, in spite of the high temperatures prevailing in the wells wherein these tubes are used. These temperatures may reach 80° C. at a boring depth of about 2000 meters and even more than 100° C. at a boring depth of about 3000 meters.

This process provides the fiberglass inner tube of a cemented steel end fitting on the top, in which a box thread connected is cut. The connection of the fiberglass inner tube to the swivel head is than similar to that of the usual inner tube of steel.

The length of the tube itself consists of two fiberglass lengths coupled together. The bottom part of the tube is also provided with a steel-end fitting, corresponding to the inner tube upper half shoe.

The synthetic resin reinforced by means of glass fibers has a small Young modulus compared to that of steel. When an inner tube element made of synthetic resin is used, the tube subjected to an important traction will become deformed long before the threaded steel coupling nipples, so that the latter are not damaged and can be used again.

For this purpose, the steel nipples 3, 4 are removed, by severing the tube element, when the latter is raised with the core, when the coring apparatus is retrieved.

The resin residues which still adhere to the nipples are removed by heating and the nipples are then ready to be used again.

The inner tube elements according to this invention have the following advantages:
  no corrosion problems;
  increased homogeneity in respect of the resistance of the tubes;
  possibility of transport of an unchanged core, as it has been collected;
  easy manufacture: the inner diameter of the tube elements corresponds to the diameter of the mandrel, whereas the outer diameter may very within rather wide limits, since this outer diameter is only subjected to one restriction, namely that it must allow sufficient space for the flow of the boring liquid;

possibility of longitudinal and transverse cutting of the coring tube on the workings for an immediate analysis by the geologists;

use of portable tools;

possible recovery of the nipples, when steel coupling nipples are used.

The invention is of course not limited to the above described details which can be modified within the scope of the following claims.

We claim:

1. Process for manufacturing an inner tube element (1) for a double tube coring apparatus, said element consisting of a rigid tube length (2) having a substantially constant section, made of synthetic resin and provided with couplings (3, 4) for connecting it to other inner tube elements, in which process at least one metallic nipple (3) is placed onto a cylindrical winding mandrel (11) at a predetermined axial position corresponding to the length of tube element to be manufactured, a part of said nipple (3) having an inner diameter substantially identical to the diameter of the mandrel (11) and having a rough surface (14), and fibers (16) coated with a synthetic resin are wound helically onto said cylindrical mandrel (11) so as to overlap the rough surface (14) of said nipple (3) the process being characterized by the further steps of providing said nipple (3) both with a gripping ring (13), and helically winding the fibers (16) onto the mandrel (11) and onto the gripping ring (13) in order to allow the tube element to withstand axial tensile stress in a double tube coring apparatus, and also with an annular shoulder (25) with which the threaded portion of a connected inner tube element comes in abutment when the nipple is screwed home and on which the resin body of said connected inner tube element may rely in order to resist axial compression stresses.

* * * * *